(12) United States Patent
Lin

(10) Patent No.: US 8,220,767 B2
(45) Date of Patent: Jul. 17, 2012

(54) SUPPORTING STAND WITH ANGLE ADJUSTMENT FUNCTION

(76) Inventor: Chin-Sheng Lin, New Taipei (TW)

( * ) Notice: Subject to any disclaimer, the term of this patent is extended or adjusted under 35 U.S.C. 154(b) by 0 days.

(21) Appl. No.: 13/104,443

(22) Filed: May 10, 2011

(65) Prior Publication Data

US 2012/0006962 A1   Jan. 12, 2012

(30) Foreign Application Priority Data

Jul. 9, 2010   (TW) .............................. 99213175 U

(51) Int. Cl.
  *A47B 97/00* (2006.01)
(52) U.S. Cl. ......... 248/370; 248/917; 248/166; 248/127
(58) Field of Classification Search .................. 248/127, 248/146, 371, 455, 456, 370, 917–923, 450, 248/460, 462, 447, 463, 166, 168, 185.1, 248/441.1; 281/45; 16/321, 322, 308, 285, 16/286, 277, 281, 297
See application file for complete search history.

(56) References Cited

U.S. PATENT DOCUMENTS

| 4,253,260 | A | * | 3/1981 | Maza et al. ..................... 40/610 |
| 4,296,946 | A | * | 10/1981 | Larre et al. ....................... 281/45 |
| 4,605,193 | A | * | 8/1986 | Kuparinen .................... 248/460 |
| 5,957,417 | A | * | 9/1999 | Yu ................................. 248/166 |
| 6,196,512 | B1 | * | 3/2001 | Ure ................................ 248/464 |
| 6,557,811 | B1 | * | 5/2003 | Burns ........................... 248/460 |
| D646,903 | S | * | 10/2011 | Santana ........................ D6/310 |

* cited by examiner

*Primary Examiner* — Terrell McKinnon
*Assistant Examiner* — Steven Marsh
(74) *Attorney, Agent, or Firm* — Chun-Ming Shih; HDLS IPR Services

(57) ABSTRACT

A supporting stand with an angle adjustment function includes two plates and an angle-adjusting means. The angle-adjusting means includes a locking ring, two protruding rings and an adjusting rod. The locking ring is provided on one plate and has axial grooves. The two protruding rings are provided on the other plate. The locking ring is coaxially disposed between the two protruding rings. One of the protruding rings is provided with a restricting slot aligned with the axial grooves. The adjusting rod penetrates the two protruding rings and the locking ring. The adjusting rod is formed with an engaging key engaged with one axial groove and the restricting slot. When the engaging key is removed from the axial groove, the two plates rotate relative to each other by using the adjusting rod as the center of rotation, thereby adjusting the inclination angle of the supported object.

10 Claims, 9 Drawing Sheets

SUPPORTING STAND WITH ANGLE ADJUSTMENT FUNCTION

BACKGROUND OF THE INVENTION

1. Field of the Invention

The present invention relates to a supporting stand, in particular to a supporting stand with angle adjustment function.

2. Description of Prior Art

With the advancement of science and technology, many compact electronic devices are proposed and widely used in our daily life, such as mobile phones, digital cameras, personal digital assistants, smart phones, electronic books or the like. When a user intends to dispose a compact electronic device on the disk or table, the user may put the compact electronic device on an inclined supporting stand, so that the compact electronic device can be supported by the supporting stand in an inclined manner. In this way, the user can see the information displayed on a screen of the compact electronic device easily.

However, among the conventional supporting stands, most of them have a complicated structure including a plurality of connecting rods and supporting legs. Further, some conventional supporting stands can only stand on the desk/table without being folded. Even some conventional supporting stands can be folded for storage, they cannot adjust the inclination angle thereof. Thus, the user cannot adjust the viewing angle of the compact electronic device supported by the inclined supporting stand if necessary.

Therefore, it is an important issue for the present Inventor to solve the above-mentioned problems.

SUMMARY OF THE INVENTION

The present invention is to provide a supporting stand with an angle adjustment function, which is capable of allowing a user to adjust the inclination angle of an object supported by the supporting stand. Further, the supporting stand of the present invention can be folded for better storage.

The present invention provides a supporting stand with an angle adjustment function, configured to support an object in an inclined manner, the supporting stand including:

two plates, one of which being leaned by the object; and an angle-adjusting means connected to the two plates in such a manner that the two plates form an included angle and stand up with their free ends, the angle-adjusting means comprising:

a locking ring provided in one of the two plates, an inner wall of the locking ring being provided with a plurality of axial grooves;

two protruding rings provided in the other of the two plates, the locking ring being coaxially disposed between the two protruding rings, an inner wall of one of the protruding rings being provided with a restricting slot aligned with the axial groove; and an adjusting rod penetrating the two protruding rings and the locking ring, a peripheral surface of the adjusting rod being formed with an engaging key engaged with the axial groove and the restricting slot;

wherein the two plates rotate relative to each other by using the adjusting rod as a center of rotation when the engaging key is removed from the axial groove, thereby adjusting the included angle between the two plates and thus an inclination angle of the object.

In comparison with prior art, the present invention has advantageous features as follows.

According to the angle-adjusting means of the present invention, since the engaging key of the adjusting rod can be selectively engaged with one of the axial grooves of the locking ring, the included angle between the two plates and the inclination angle of the object supported by one of the two plates can be adjusted. Thus, the user can adjust the inclination angle of the object based on practical demands easily.

According to the present invention, when the supporting stand is not in use, the user can adjust the included angle between the two plates to zero degree. In other words, the supporting stand of the present invention can be folded for better storage.

The supporting stand of the present invention can be used in various kinds of objects including compact electronic devices, books, photo frames, picture frames, billboards or the like. Further, the user can adjust the inclination angle of the object supported by the supporting stand based on practical demands. Therefore, the present invention really has practicability.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
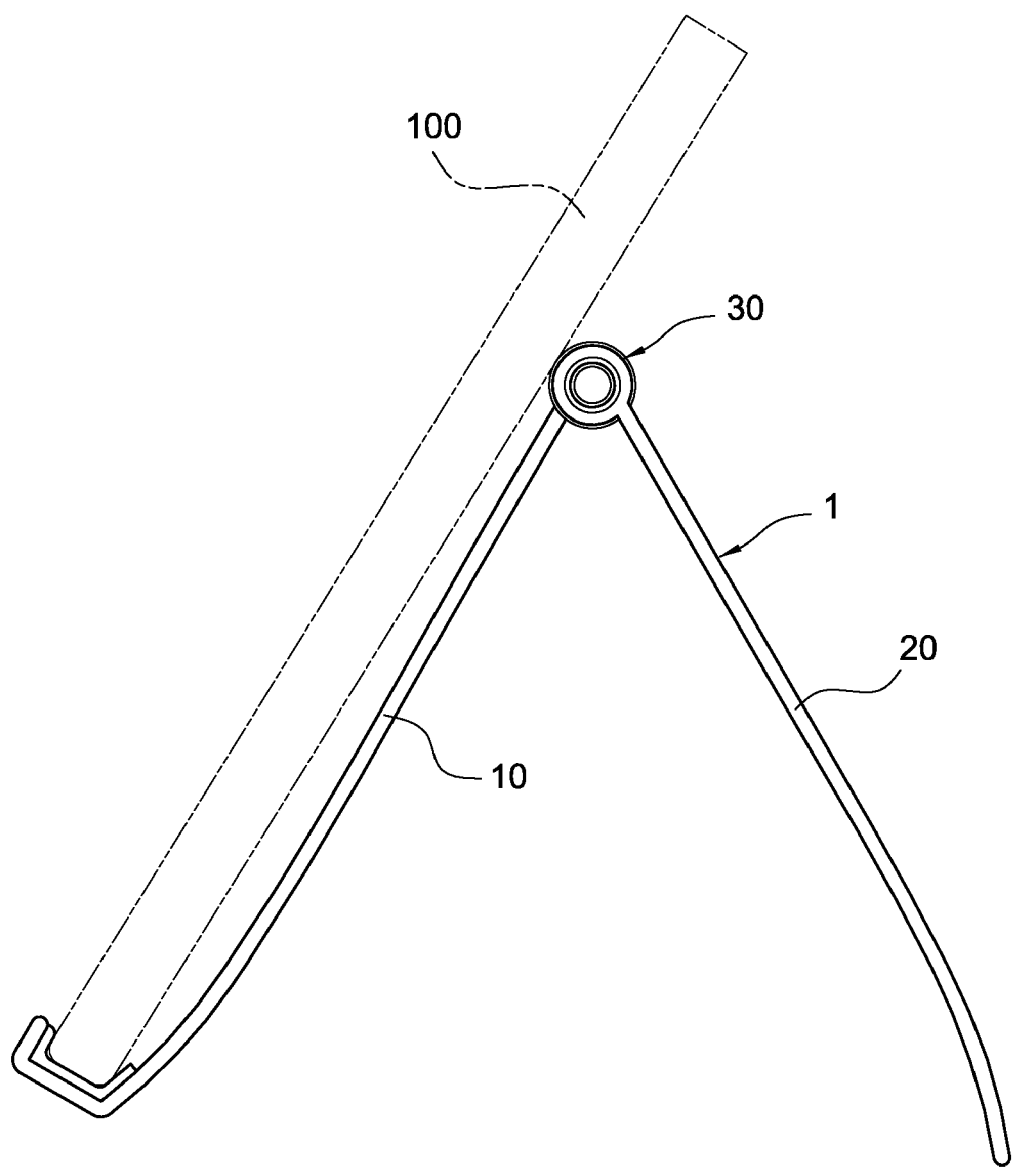
FIG. 1 is a schematic view showing the application of the present invention.

Please refer to FIG. 1. The present invention provides a supporting stand 1 with an angle adjustment function. The supporting stand 1 is configured to support an object 100 on an operating surface (not shown) in an inclined manner.

Figure 2:
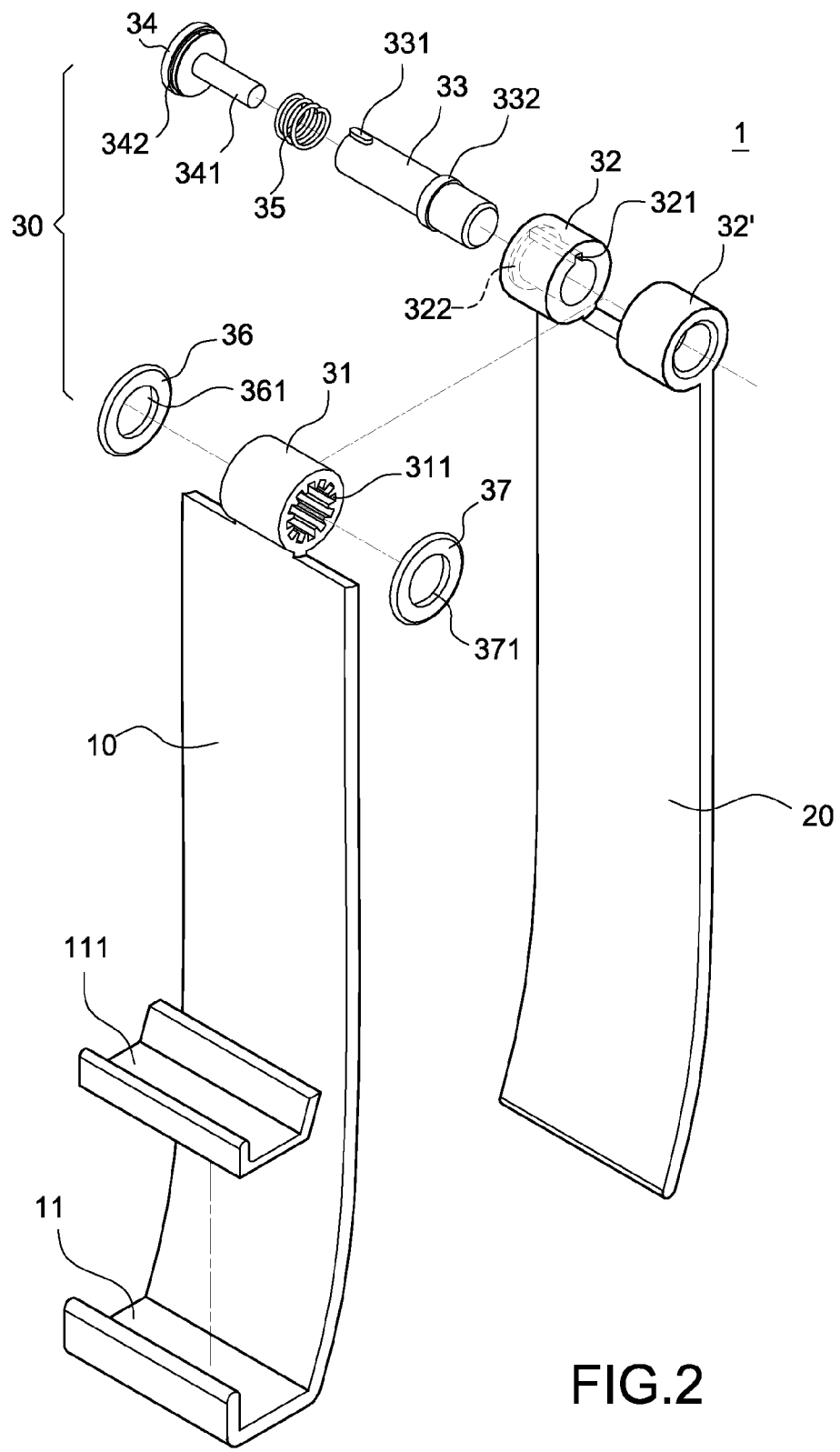
FIG. 2 is an exploded perspective view showing the supporting stand of the present invention.
Figure 3:
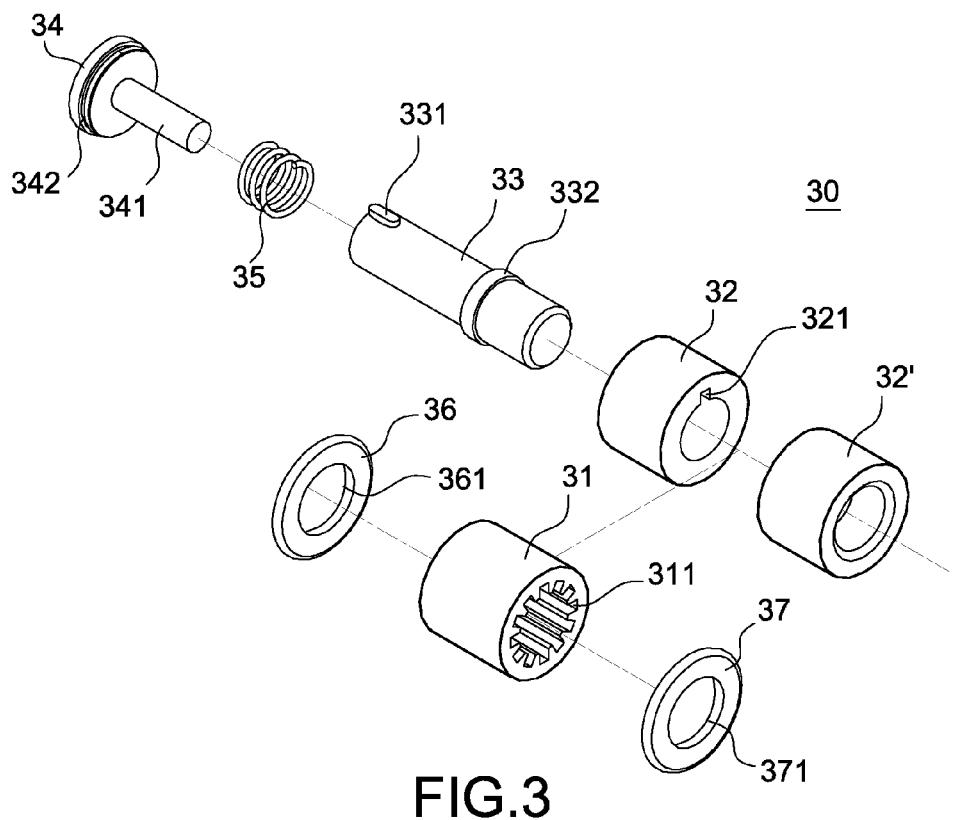
FIG. 3 is an exploded perspective view showing the angle-adjusting means of the present invention.
Figure 4:
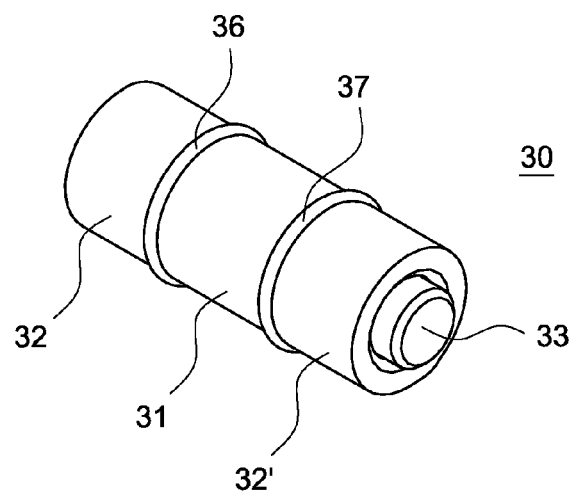
FIG. 4 is an assembled perspective view showing the angle-adjusting means of the present invention.

Please refer to FIGS. 2 to 4. The supporting stand 1 includes a first plate 10, a second plate 20, and an angle-adjusting means 30.

As shown in FIG. 2, each of the first plate 10 and the second plate 20 is substantially shaped as a rectangular plate and may be made of any suitable materials such as metal, wood or plastic. Thus, the material of the first plate 10 or the second plate 20 is not limited to any specific material.

In the present embodiment of the present invention, the first plate 10 is located in front of the second plate 20, and the object 100 leans against the first plate 10. One end of the first plate 10 contacting the operating surface is formed with a supporting portion 11. The supporting portion 11 has a certain width, so that the object 100 of a thickness can be disposed on the supporting portion 11. If the thickness of the object 100 is so small that it may slide on the supporting portion 11, an additional slide-proof sleeve 11 can be disposed on the supporting portion 11. In this way, as shown in FIG. 1, the object 100 can be stably disposed on the supporting portion 11 of the first plate 10.

In the present invention, the angle-adjusting means 30 is provided between the first plate 10 and the second plate 20. The angle-adjusting means 30 is configured to connect the two plates 10 and 20 in such a manner that the two plates 10 and 20 form an included angle and stand on the operating surface. The angle-adjusting means 30 comprises a locking ring 31, two protruding rings 32, 32', and an adjusting rod 33.

As shown in FIG. 2, the locking ring 31 is provided in the center of one end of the first plate 10. The inner wall of the locking ring 31 is provided with a plurality of axial grooves 311. The two protruding rings 32 and 32' are provided on one end of the second plate 20. The locking ring 31 is coaxially disposed between the two protruding rings 32 and 32'. More specifically, the protruding ring 32 is located on the left side of the locking ring 31, and the protruding ring 32' is located on the right side of the locking ring 31. The inner wall of the left-side protruding ring 32 is provided with a restricting slot 321 aligned with the axial groove 311. As shown in the cross-sectional view of FIG. 6, the inner wall of the right-side protruding ring 32' is provided with a stopping wall 321', thereby preventing the adjusting rod 33 from sliding out of the right-side protruding ring 32'.

The adjusting rod 33 penetrates the left-side protruding ring 32, the locking ring 31 and the right-side protruding ring 32'. The peripheral surface of the adjusting rod 33 is formed with an engaging key 331 engaged with the axial groove 311 and the restricting slot 321. Further, the peripheral surface of the adjusting rod 33 is formed with a stopping flange 332 away from the engaging key 331. The stopping flange 332 abuts against the stopping wall 321' inside the protruding ring 32', thereby preventing the adjusting rod 33 from sliding out of the right-side protruding ring 32' on the second plate 20.

Figure 5:
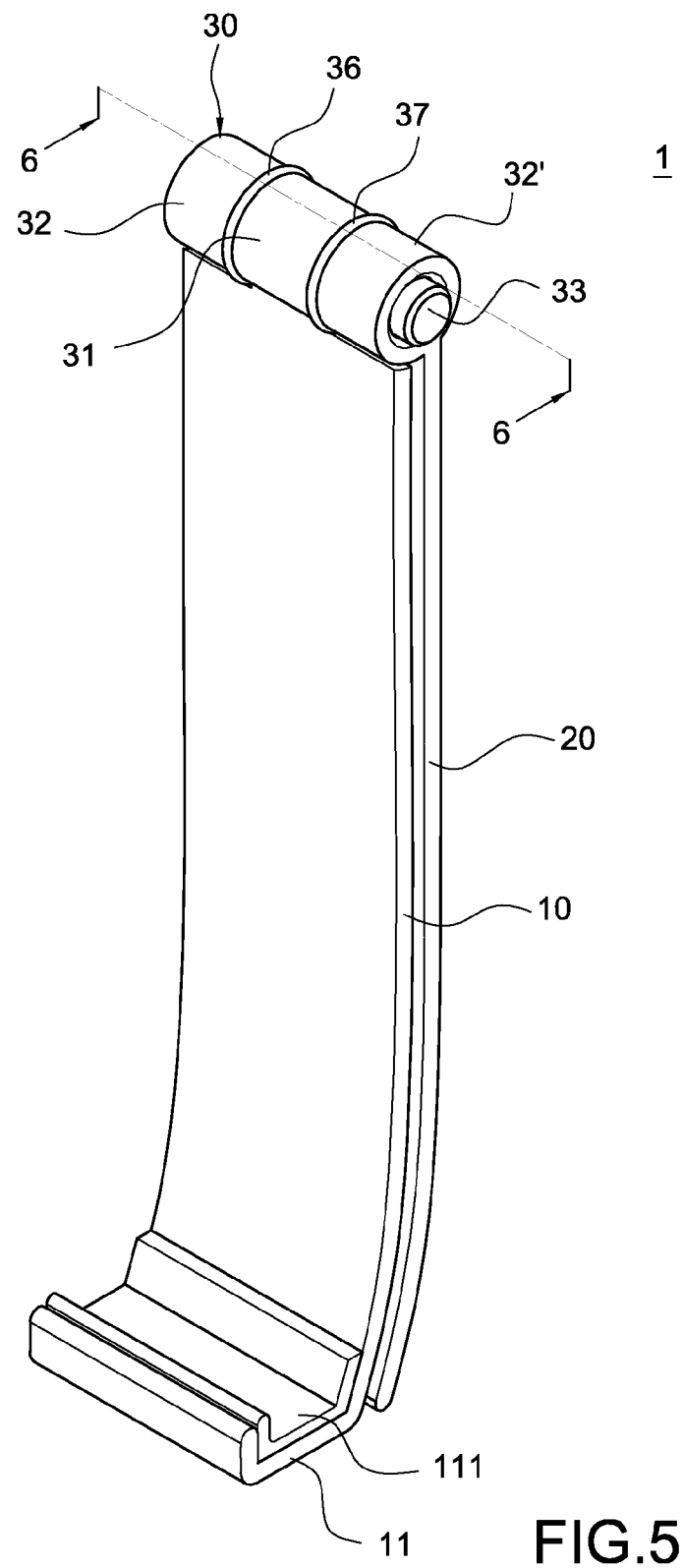
FIG. 5 is a perspective view showing that the supporting stand of the present invention is folded.

As shown in FIG. 5, the first plate 10 is aligned with the second plate 20 in such a manner that the locking ring 31 is coaxially disposed between the two protruding rings 32 and 32'. Then, the adjusting rod 33 is inserted into the left-side protruding ring 32 of the second plate 20 to penetrate the locking ring 31 of the first plate 10 and is inserted into the right-side protruding ring 32' of the second plate 20. Then, as shown in FIG. 3, a T-shaped fixing piece 34 and a spring 35 put on a post 341 of the fixing piece 34 are inserted into the left-side protruding ring 32 of the second plate 20, so that the adjusting rod 33 can be restricted between the two protruding rings 32 and 32'.

Figure 6:
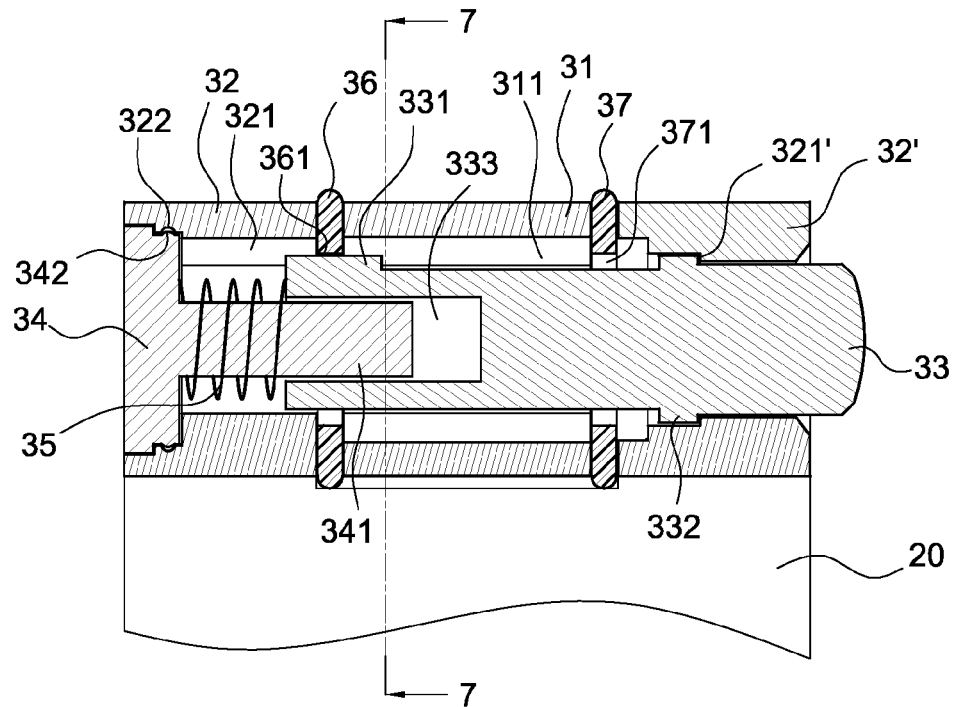
FIG. 6 is a cross-sectional view taken along the line 6-6 in FIG. 5.

More specifically, as shown in FIG. 6, the inner wall of the left-side protruding ring 32 of the second plate 20 has inner threads 322. The periphery surface of the fixing piece 34 is formed with outer threads 342 engaged with the inner threads 322. When the fixing piece 34 is threadedly fixed to the left-side protruding ring 32, the adjusting rod 33 can be surely restricted between the protruding rings 32 and 32' without sliding out of them.

Further, in order to make the adjusting rod 33 has a travelling distance for allowing itself to move in or out of the axial groove 311 of the locking ring 31, the left end of the adjusting rod 33 has a trough 333 as shown in FIG. 6; the trough 333 allows the post 341 of the fixing piece 34 to be inserted therein. The depth of the trough 333 is larger that the length of the post 341 inserted into the trough 333. Thus, a small space exists between the adjusting rod 33 and the post 341 for allowing the adjusting rod 33 to move therein.

In order to prevent the protruding rings 32, 32' and the locking ring 31 from suffering damage due to wears, a plastic gasket 36 is provided between the left-side protruding ring 32 and the locking ring 31, and another plastic gasket 37 is provided between the right-side protruding ring 32' and the locking ring 31. The plastic gaskets 36 and 37 can reduce the wears among these three elements 32, 32' and 31. The gaskets 36 and 37 are respectively provided with a central through-hole 361 and 371 for allowing the engaging key 331 and the stopping flange 332 of the adjusting rod 33 to pass through.

Please refer to FIGS. 6 to 10. The operation for adjusting the angle of the supporting stand 1 of the present invention is described.

Figure 7:
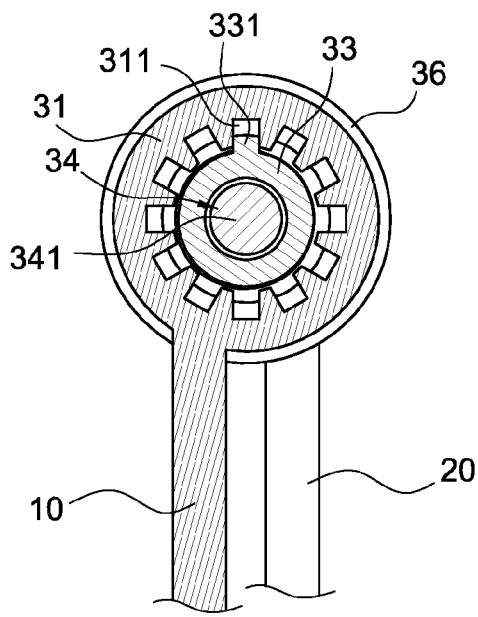
FIG. 7 is a cross-sectional view taken along the line 7-7 in FIG. 6.

As shown in FIG. 6, when the adjusting rod 33 penetrates the protruding rings 32 and 32', the adjusting rod 33 will be naturally pushed rightwards by the elastic force of the spring 35 until the stopping flange 332 of the adjusting rod 33 abutting against the stopping wall 321' of the right-side protruding ring 32'. At this time, as shown in FIG. 7, since the engaging key 331 of the adjusting rod 333 is located between one of the axial grooves 311 of the locking ring 31 and the restricting slot 321 of the protruding ring 32, the locking ring 31 and the protruding ring 32 are engaged by the engaging key 331 without any relative rotation.

Figure 8:
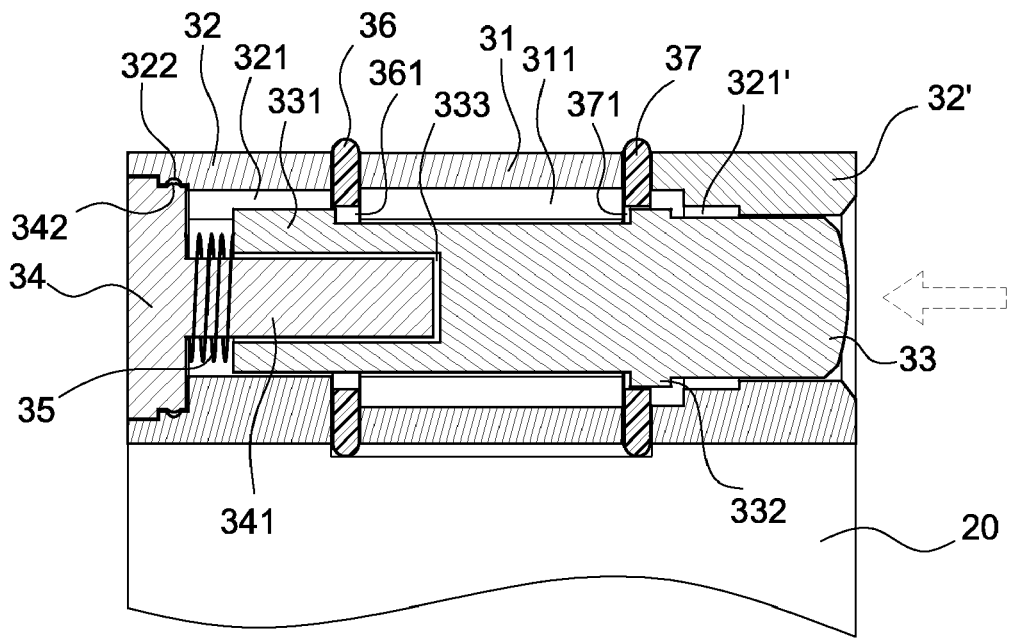
FIG. 8 is a partially cross-sectional view showing the angle-adjusting means of the present invention, wherein the adjusting rod is pressed to remove the engaging key from the axial groove of the locking ring.
Figure 9:
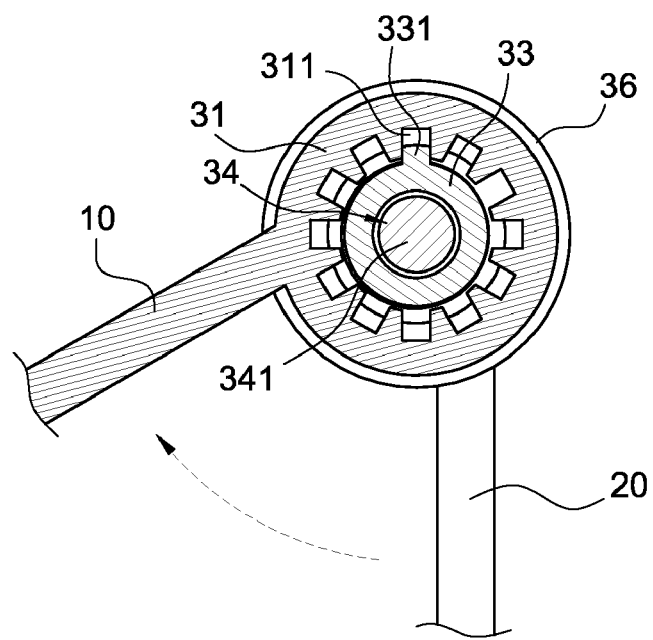
FIG. 9 is a schematic view showing that the angle of the supporting stand of the present invention is adjusted.

As shown in FIG. 8, when the user presses the adjusting rod 33 from the outside of the right-side protruding ring 32', the adjusting rod 33 is caused to move leftwards a distance to remove the engaging key 331 from the axial groove 311. At this time, since the locking ring 31 is not engaged by the engaging key 331, the locking ring 31 can rotate relative to the left-side protruding ring 32. Thus, the first plate 10 can rotate relative to the second plate 20, so that the user can adjust the included angle between the first plate 10 and the second plate 20 as shown in FIG. 9.

Figure 10:
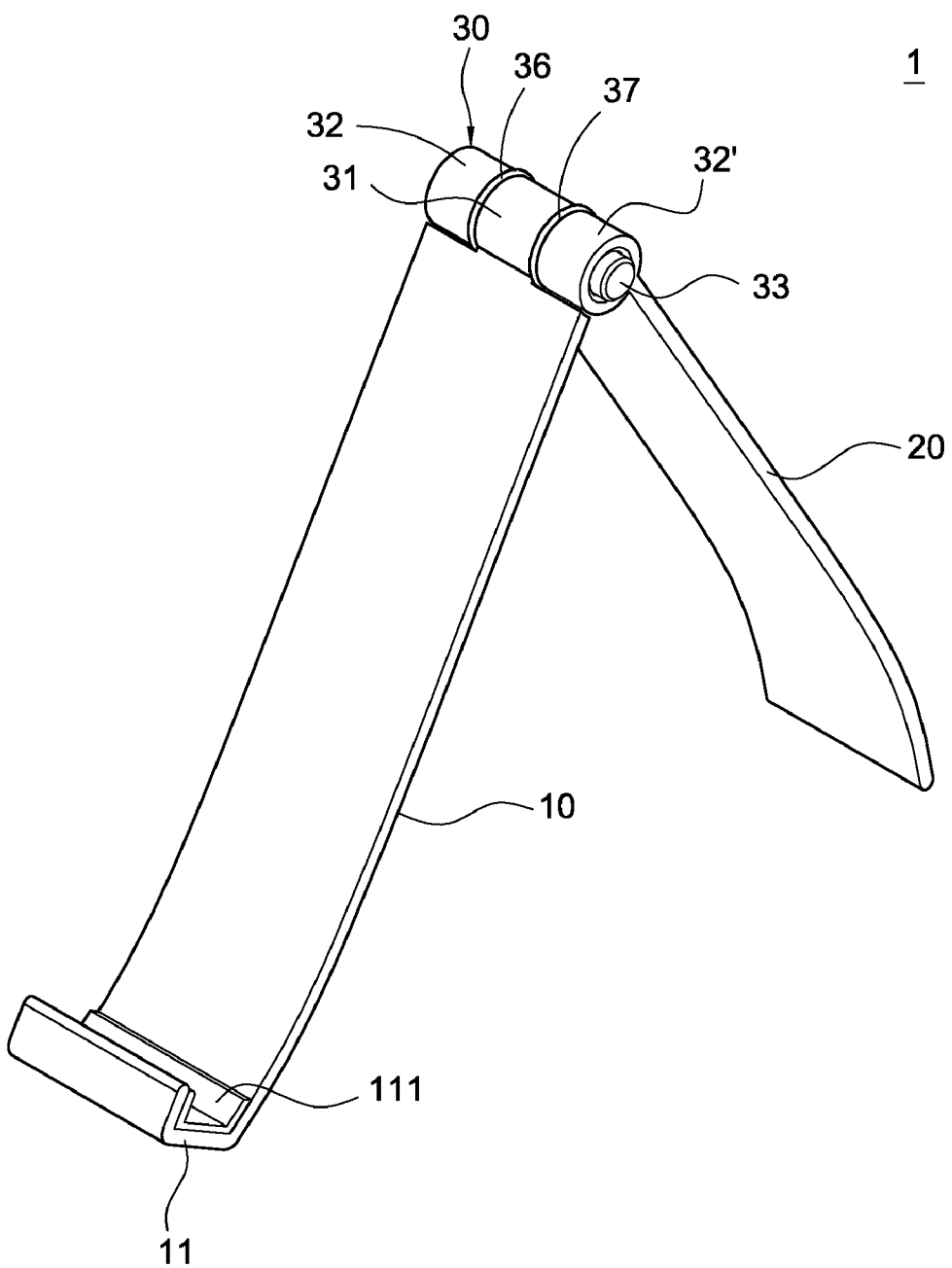
FIG. 10 is a perspective view showing that the supporting stand of the present invention is unfolded.

When a desired included angle between the first plate 10 and the second plate 20 is achieved, the user can release the adjusting rod 33. As a result, the adjusting rod 33 will be moved rightwards by the elastic force of the spring 35 until the stopping flange 332 abutting against the stopping wall 321' as shown in FIG. 6. At this time, the first plate 10 is unfolded relative to the second plate 20 to achieve the desired included angle as shown in FIG. 10.

Figure 11:
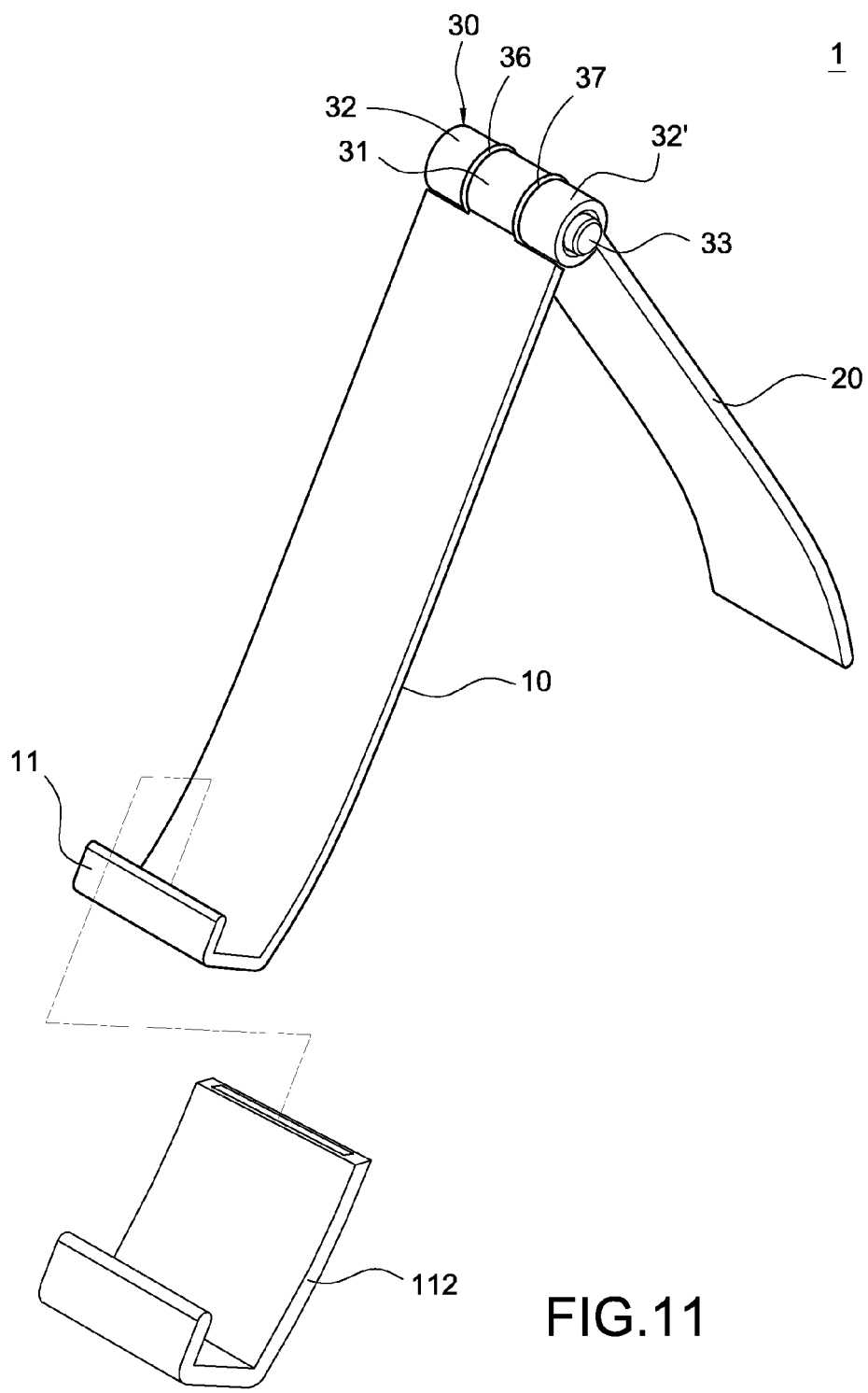
FIG. 11 is a perspective view showing that a slide-proof sleeve of the present invention.

Please refer to FIG. 11. The supporting stand 11 of the present invention can cooperate with a slide-proof sleeve 112. The profile of the slide-proof sleeve 112 is substantially similar to the profile of the supporting portion 11 of the first plate 10, so that the slide-proof sleeve 112 can be put on the supporting portion 11, thereby generating a slide-proof effect. In this way, the supporting stand 1 can stand on the operating surface more stably.

Figure 12:
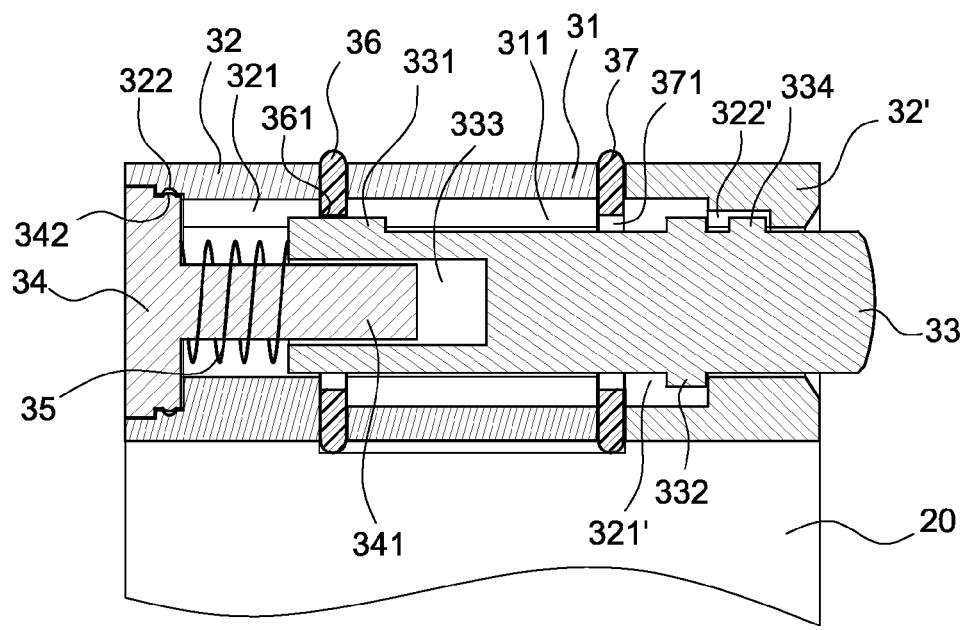
FIG. 12 is a partially cross-sectional view showing the angle-adjusting means according to another embodiment of the present invention.
Figure 13:
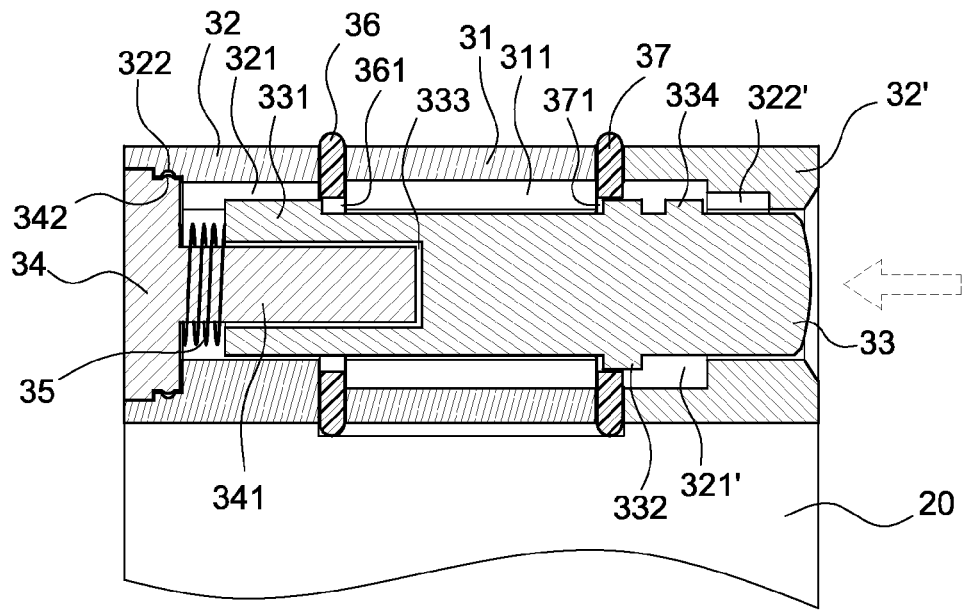
FIG. 13 is a partially cross-sectional view showing the angle-adjusting means according to another embodiment of the present invention, wherein the adjusting rod is pressed to remove the engaging key from the axial groove of the locking ring.

Please refer to FIGS. 12 and 13, which show another embodiment of the present invention. The difference between the present embodiment and the previous embodiment lies in that: the inner wall of the right-side protruding ring 32' is additionally provided with an auxiliary restricting slot 322'. The peripheral surface of the adjusting rod 33 is formed with an auxiliary engaging key 334 engaged with the auxiliary restricting slot 322'. As shown in FIG. 12, in a normal state, the engaging key 331 of the adjusting rod 33 can be engaged with the axial groove 311 of the locking ring 31 and the restricting slot 321 of the left-side protruding ring 32. Further, the auxiliary engaging key 334 of the adjusting rod 33 is engaged with the auxiliary restricting slot 322' of the right-side protruding ring 32'. When the user presses the adjusting rod 33 from the outside of the right-side protruding ring 32', the adjusting rod 33 is caused to move leftwards to remove the engaging key 331 from the axial groove 311 of the locking ring 31 and remove the auxiliary engaging key 334 from the auxiliary restricting slot 322'. At this time, the locking ring 31 can rotate relative to the protruding rings 32 and 32', thereby adjusting the included angle between the first plate 10 and the second plate 20. Thus, the present embodiment can achieve the same effect as the previous embodiment.

In comparison with prior art, the present invention has advantageous features as follows.

According to the angle-adjusting means 30 of the present invention, since the engaging key 331 of the adjusting rod 33 can be selectively engaged with one of the axial grooves 311 of the locking ring 31, the included angle between the first plate 10 and the second plate 20 as well as the inclination angle of the object 100 supported by one of the two plates 10 can be adjusted. Thus, the user can adjust the inclination angle of the object 100 based on practical demands easily.

According to the present invention, when the supporting stand 1 is not in use, the user can adjust the included angle between the first plate 10 and the second plate 20 to zero degree. In other words, the supporting stand 1 of the present invention can be folded for better storage.

The supporting stand 1 of the present invention can be used in various kinds of objects 100 including compact electronic devices, books, photo frames, picture frames, billboards or the like. Further, the user can adjust the inclination angle of the object 100 supported by the supporting stand 1 based on practical demands. Therefore, the present invention really has practicability.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A supporting stand with an angle adjustment function, configured to support an object in an inclined manner, the supporting stand including:
    two plates, including a first plate and the object leaning against the first plate when the supporting stand is in an opened configuration; and
    an angle-adjusting means connected to the two plates in such a manner that the two plates form an included angle and stand up with their free ends, the angle-adjusting means comprising:
    a locking ring provided on one of the two plates, an inner wall of the locking ring being provided with a plurality of axial grooves;
    two protruding rings provided on the other of the two plates, the locking ring being coaxially disposed between the two protruding rings, an inner wall of one of the protruding rings being provided with a restricting slot aligned with one of the axial grooves; and
    an adjusting rod penetrating the two protruding rings and the locking ring, a peripheral surface of the adjusting rod being formed with an engaging key engaged with one of the axial grooves and the restricting slot;
    wherein the two plates rotate relative to each other by using the adjusting rod as a center of rotation when the engaging key is removed from one of the axial grooves, thereby adjusting the included angle between the two plates and thus an inclination angle of the object.

2. The supporting stand with an angle adjustment function according to claim 1, wherein the two protruding rings include a left-side protruding ring and a right-side protruding ring spaced from the left-side protruding ring, the restricting slot is formed in the left-side protruding ring, an inner wall of the right-side protruding ring is provided with a stopping wall, the peripheral surface of the adjusting rod is formed with a stopping flange away from the engaging key, the stopping flange abuts against the stopping wall to prevent the adjusting rod from sliding out of the right-side protruding ring.

3. The supporting stand with an angle adjustment function according to claim 2, further including a fixing piece, the fixing piece being fixed to the left-side protruding ring to prevent the adjusting rod from sliding out of the left-side protruding ring.

4. The supporting stand with an angle adjustment function according to claim 3, wherein the fixing piece is formed with a post penetrating the left-side protruding ring, the adjusting rod has a trough for allowing the post to be inserted therein, a depth of the trough is larger than a length of the post inserted into the trough.

5. The supporting stand with an angle adjustment function according to claim 3, further including a spring put on the fixing piece for elastically abutting the adjusting rod.

6. The supporting stand with an angle adjustment function according to claim 3, wherein an inner wall of the left-side protruding ring has inner threads, a peripheral surface of the fixing piece is formed with outer threads engaged with the inner threads.

7. The supporting stand with an angle adjustment function according to claim 3, wherein the inner wall of the right-side protruding ring is further provided with an auxiliary restricting slot, the peripheral surface of the adjusting rod is formed with an auxiliary engaging key inserted into the auxiliary restricting slot.

8. The supporting stand with an angle adjustment function according to claim 3, wherein a free end of the first plate is formed with a supporting portion for allowing the object to be disposed thereon, the supporting portion is provided with a slide-proof sleeve.

9. The supporting stand with an angle adjustment function according to claim 3, wherein a gasket is provided between the left-side protruding ring and the locking ring, and another gasket is provided between the right-side protruding ring and the locking ring.

10. The supporting stand with an angle adjustment function according to claim 9, wherein the one gasket has a central through-hole for allowing the engaging key to pass through, and the other gasket has another central through-hole for allowing the stopping flange to pass through.

\* \* \* \* \*